March 6, 1951  J. D. TASKER  2,544,514
ELECTRICALLY HEATED APPARATUS
FOR FITTING LENS INTO FRAMES
Filed June 21, 1947  2 Sheets-Sheet 1
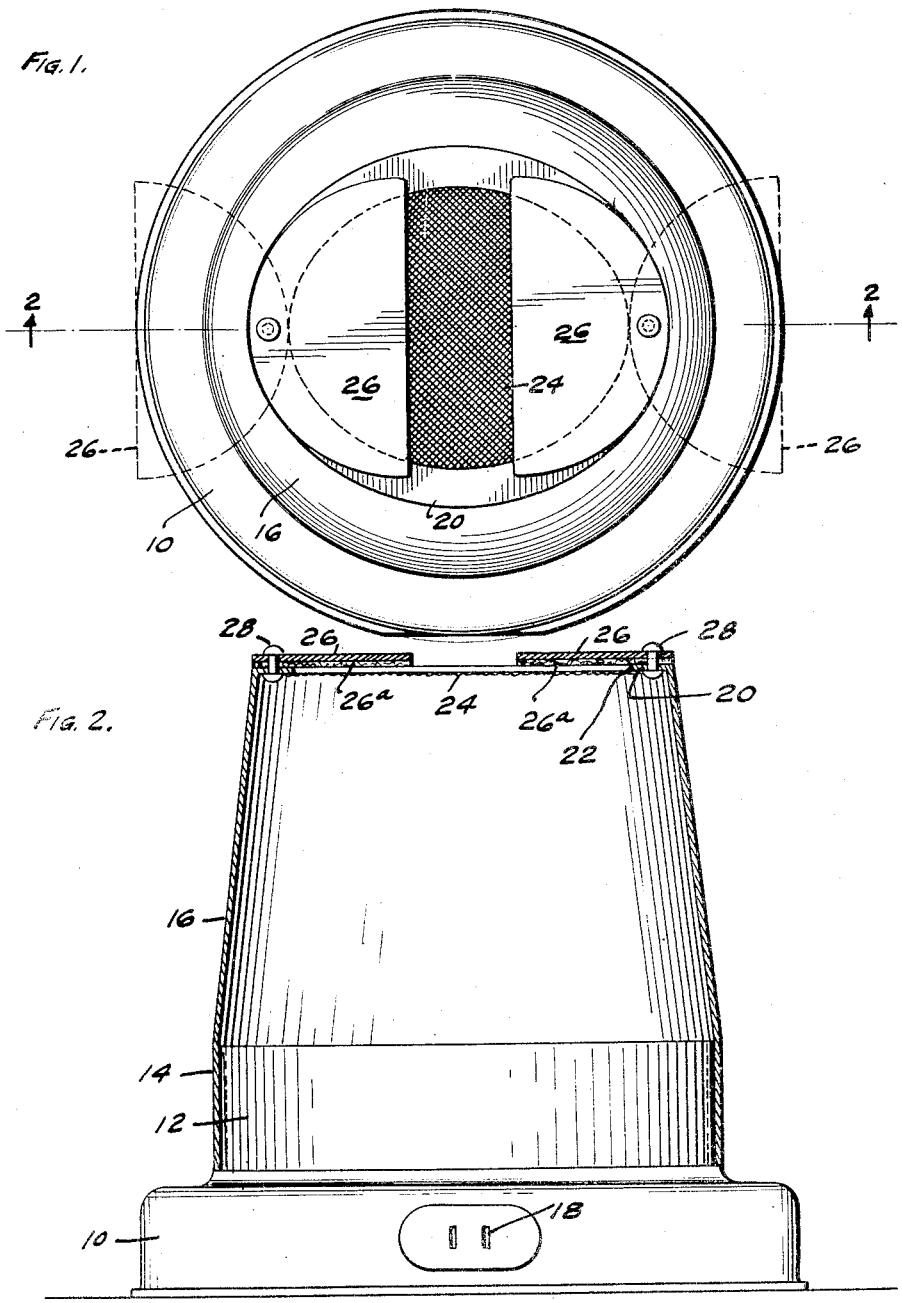
INVENTOR.
DR. JAMES D. TASKER
BY
Harry H. Hitzeman
ATTORNEY.

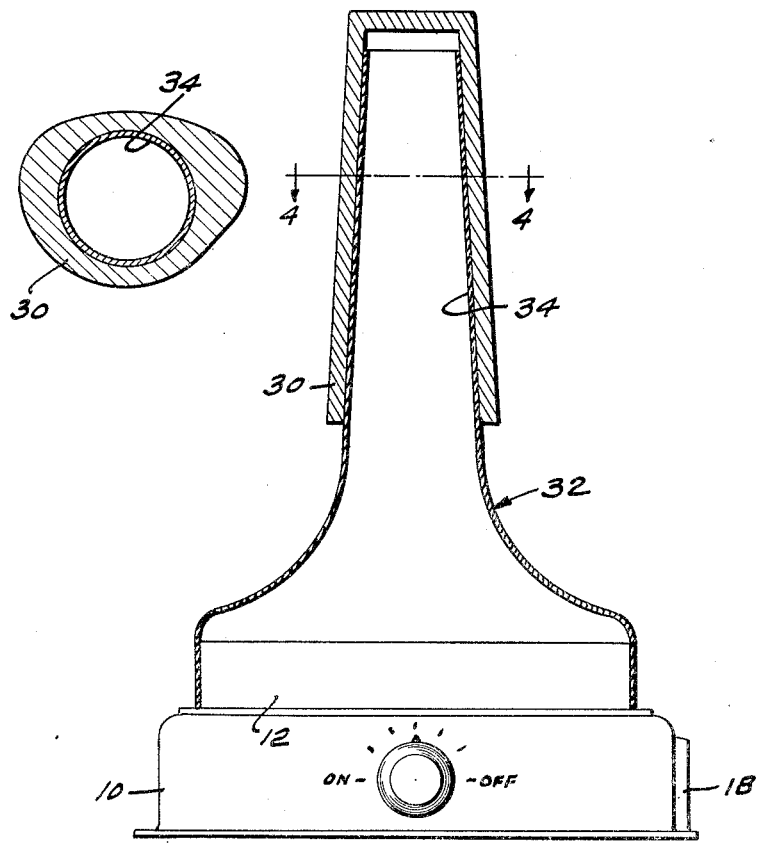
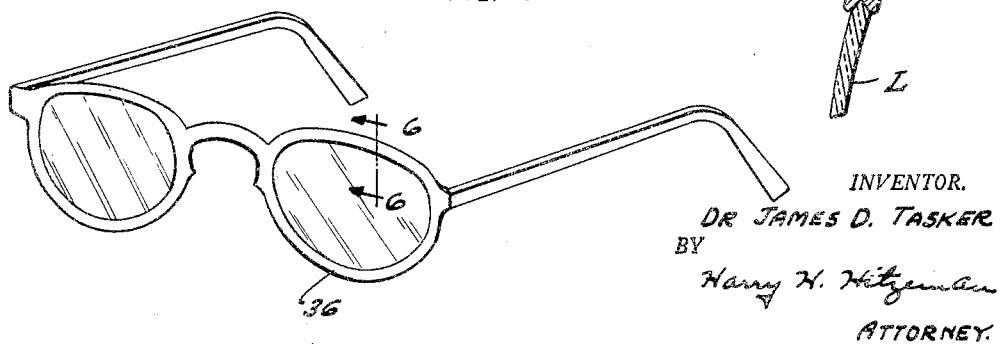

Patented Mar. 6, 1951

2,544,514

UNITED STATES PATENT OFFICE 2,544,514

ELECTRICALLY HEATED APPARATUS FOR FITTING LENS INTO FRAMES

James D. Tasker, Chicago, Ill.

Application June 21, 1947, Serial No. 756,123

1 Claim. (Cl. 219—35)

My invention relates to an improved method for fitting lens into frames and more particularly to an improved method and means for fitting the eye wires of frames for glasses around the lens and forming the bridge and temples, so that the completed glasses will accurately fit the wearer.

My invention relates also to an improved apparatus for preparing the frames, so that they can be correctly fitted to the wearer. In assembling lens with plastic or similar frames, the lens are prepared and then fitted into the eye wires and fastened into place therein. Then the bridge must be fitted to the size of the nose of the wearer and the temples adjusted to the correct distance to the ears and to fasten over the same.

In preparing the plastic frames in the manner above described, it is necessary to heat the frames to make them pliable, so they can be formed to suit the particular requirements. Heretofore, this has been done by emersing the frames into hot water for a period of time, so that the heat renders the plastic material more pliable and the various parts of the frame can be bent to the desired size and shape.

The principal object of the present invention is to provide an improved method for fitting lens into frames by preparing the frames and rendering them pliable by means of direct radiated heat as contrasted to emersing the same in hot water.

A further object of the invention is to provide an improved apparatus for carrying out the above operation.

A further object of the invention is to provide an apparatus of the type described that is highly efficient for the purposes set forth, is easily and cheaply made, performs the operations desired in a minimum of time and will not become broken or out of order, in spite of long and hard usage.

Other objects and advantages will be more apparent from the following description, wherein reference is had to the accompanying drawings upon which:

Fig. 1 is a plan view of a preferred type of apparatus for the purpose described;

Fig. 2 is a cross sectional view of the same taken generally on the line 2—2 of Fig. 1;

Fig. 3 is a similar cross sectional view of a modified form of construction for use with heating cones normally employed to heating individual eye wire;

Fig. 4 is a cross sectional view thereof taken generally on the line 4—4 of Fig. 3;

Fig. 5 is a front perspective view illustrating generally the type of frames which are treated by my method and apparatus; and Fig. 6 is a fragmentary sectional view through one of the eye wires and lens, being taken generally on the line 6—6 of Fig. 5.

In the embodiment of the invention which I have chosen to illustrate and describe, in Figs. 1 and 2, I have shown the preferred form of the invention wherein I employ an electric heating element 10 which may be provided with an upwardly turned shoulder portion 12 to telescopically receive the bottom end 14 of an oven member 16. The heating may be of the usual type provided with a socket 18 to be connected to a source of electrical energy and may also have the heat control mechanism (not shown) for determining the degree of heat desired. The oven 16 may be generally circular about its lower portion and taper upwardly with a turned-in shelf portion 20 and a generally elliptically shaped opening 22. A fine screen member 24 may be disposed in the oven below the opening, as shown.

I provide a pair of generally semi-cylindrically shaped cover members 26 pivotally mounted upon the pin members 28, so that they may be rotated to the dotted line position shown in Fig. 1 to completely expose the opening 24 or they may be rotated to the closed position, shown in full lines, to expose only a portion of the opening 24.

In heating frames with the apparatus shown, when it is desired to heat an entire frame at once, the cover members are rotated to expose the opening and the frame may be positioned upon the screen member 24, so that the entire frame is exposed to all the heating radiated from the heater element 10.

If, however, it is desired to correct the bridge, for example, to either enlarge or reduce the distance between the nose pieces, the frame may be laid upon the cover members, as shown in Fig. 1, exposing only a specific portion of the frame to the heat. In order to prevent inducted heat from passing through the cover members 26, I provide a strip of asbestos 26a below each of the cover members 26, thereby effectively reducing the possibility of heating the entire frame when the unit is used, as shown in Fig. 1.

In the preparation of frames for lens, it is frequently necessary to increase the size of the opening in the eye wires to receive the lens. Accordingly, I employ heating cones such as the cone 30 shown in Figs. 3 and 4. For this purpose I remove the oven 16 from the shoulder 12 of the heater element 10 and replace it with the oven 32. This oven may have a reduced tapered extension 34, which is received within one of the cones 30 previously described. The heat from the heater is thus directed to the interior of the cone 30 and as the cone is heated it acts upon the eye wire portions of the frame, so that they may be expanded and the lens L inserted within the eye wire portions 36 of the same.

From the above and foregoing description, it will be apparent to those skilled in the art that I have provided a highly improved method of treating eye glass frames, so that the lens may be fitted into the same, a method whereby the dipping of the plastic frames into hot water or other material is avoided and one, by reason of the fact that direct heat is applied, expedites the operation to a considerable degree. By reason of the interchangeability of the ovens which I provide, it can be seen that either eye wires or entire frames may be easily and quickly operated upon by the simple transposition of the ovens.

I contemplate that changes and modifications may be made in the exact details shown and I do not wish to be limited in any particular; rather what I desire to secure and protect by Letters Patent of the United States is:

Apparatus of the class described including an electric heater member having an upwardly turned flange, an oven adapted to be telescopically positioned thereon, said oven having an elliptically shaped opening at its upper end, a screen member covering said opening and a pair of horizontally disposed semi-circular cover members pivotally mounted upon opposite sides thereof with the straight edges thereof opposed and adapted when so positioned to cover all of said opening except a central parallel sided portion medially thereof.

JAMES D. TASKER.

REFERENCES CITED

The following references are of record in the file of this patent:

UNITED STATES PATENTS

| Number | Name | Date |
| --- | --- | --- |
| 1,254,274 | Pryor | Jan. 22, 1918 |
| 1,375,801 | Ross | Apr. 26, 1921 |
| 1,541,375 | Neuwirth et al. | June 9, 1925 |
| 1,609,110 | Brown | Nov. 30, 1926 |
| 1,636,473 | Kelly | July 19, 1927 |
| 1,734,411 | Welsh | Nov. 5, 1929 |
| 2,119,908 | Ellis | June 7, 1938 |
| 2,329,520 | Duberstein et al. | Sept. 14, 1943 |